United States Patent
Schubring et al.

(10) Patent No.: US 6,672,791 B2
(45) Date of Patent: Jan. 6, 2004

(54) DOUBLE ENDED FASTENING SYSTEM

(75) Inventors: Gary L. Schubring, New Baltimore, MI (US); Allen Dale Moring, Grosse Pointe Woods, MI (US); Darren Shuan Byrne, Naugatuck, MI (US); Edward D. Murphy, Sparks, MI (US)

(73) Assignee: Newfrey LLC, Newark, DE (US)

( * ) Notice: Subject to any disclaimer, the term of this patent is extended or adjusted under 35 U.S.C. 154(b) by 6 days.

(21) Appl. No.: 10/037,223

(22) Filed: Nov. 9, 2001

(65) Prior Publication Data

US 2002/0136595 A1 Sep. 26, 2002

Related U.S. Application Data

(63) Continuation-in-part of application No. 09/352,561, filed on Jul. 13, 1999, now Pat. No. 6,341,917.
(60) Provisional application No. 60/114,275, filed on Dec. 30, 1998.

(51) Int. Cl.⁷ .................................. F16B 13/04
(52) U.S. Cl. ..................... 403/296; 403/299; 411/5
(58) Field of Search ...................... 403/296, 299, 403/292; 411/2, 5, 3, 389

(56) References Cited

U.S. PATENT DOCUMENTS

| | | |
|---|---|---|
| 3,897,713 A | 8/1975 | Gugle |
| 4,068,554 A | 1/1978 | Hirabayashi |
| 4,186,645 A | 2/1980 | Zaydel |
| 4,311,423 A | 1/1982 | Hirabayashi |
| 4,611,093 A | 9/1986 | Farmer et al. |
| 4,854,311 A * | 8/1989 | Steffee ............... 411/389 X |
| 5,171,115 A | 12/1992 | McWilliams et al. |
| 5,333,978 A * | 8/1994 | Rives ............... 411/389 |
| 5,415,507 A * | 5/1995 | Janusz et al. ............... 411/5 |

FOREIGN PATENT DOCUMENTS

| | | |
|---|---|---|
| DE | 36 10 976 A1 | 10/1987 |
| DE | 298 01 813 U1 | 3/1998 |
| EP | 0 122 685 A1 | 10/1984 |
| EP | 0 286 244 A1 | 10/1988 |
| GB | 1 461 995 | 1/1977 |
| GB | 2 274 697 A | 1/1994 |
| JP | 37-29315 | 10/1937 |
| JP | 48-18972 | 6/1973 |
| JP | 60-40809 | 3/1985 |
| JP | 62-242112 | 10/1987 |

OTHER PUBLICATIONS

Engineering Materials Handbook, vol. 2, Engineering Plastics, 1988, pp. 722–725.
Emhart Fastening Teknologies —NPR Wire Harn . . . , internet site: http://135.145.6.182/products/npr/wire.htm, Jul. 1, 1999, 2 pages.
Design Handbook for DuPont Engineering Polymers, Module 1, General Design Principels, Assembly Techniques, pp. 97–99 (published prior to 1998).
Machine Design, Basics of Design Engineering, Jun. 1992, pp. 325–326, 331, 338–339, 342–344, 347–348, 350, 355–357, 358–362, 364–365, 367–368.
Poplock Fastening System, Emhart Automotive, by Al Moring, whole booklet (believed to have been published or publicly disclosed prior to Dec. 30, 1998).
Emhart Fastening Teknologies, internet site: www.emhart.com/products, Dec. 28, 1998.
Emhart—Dodge Inserts, internet site: www.emhart.com/products/dodge, Apr. 21, 1999 (believed to have been offered for sale or publicly used prior to Dec. 30, 1998).

* cited by examiner

*Primary Examiner*—John R. Cottingham
(74) *Attorney, Agent, or Firm*—Harness, Dickey & Pierce, P.L.C.

(57) ABSTRACT

The preferred embodiment of a double ended fastening system includes a first segment for engaging a component and a second threaded segment for engaging a nut. In another aspect of the present invention, the component has a stud receiving portion made of a polymer or soft metal. A further aspect of the present invention provides a self-drilling and self-tapping feature on the stud.

49 Claims, 9 Drawing Sheets

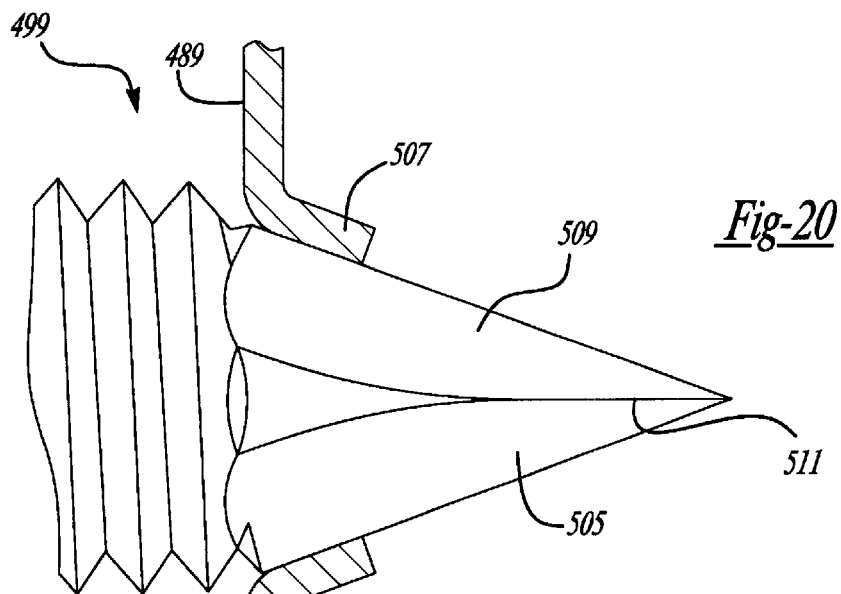
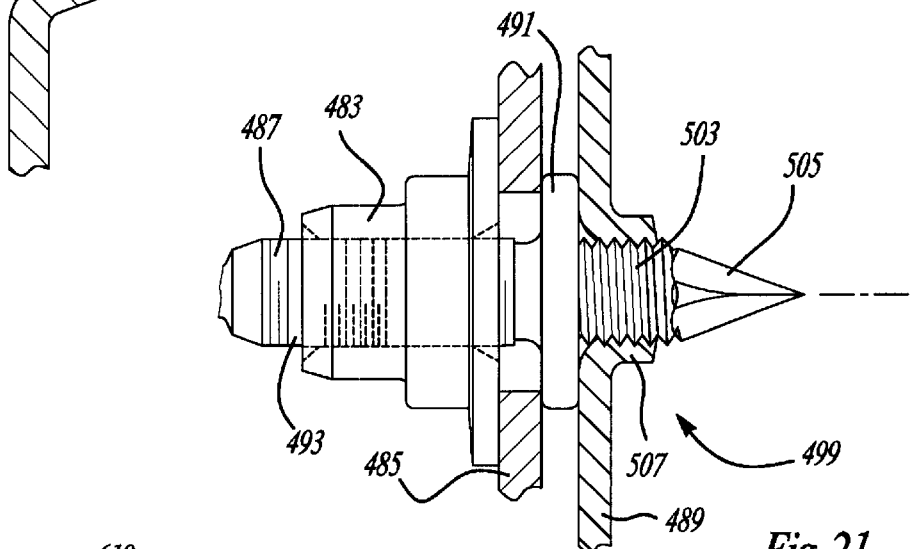
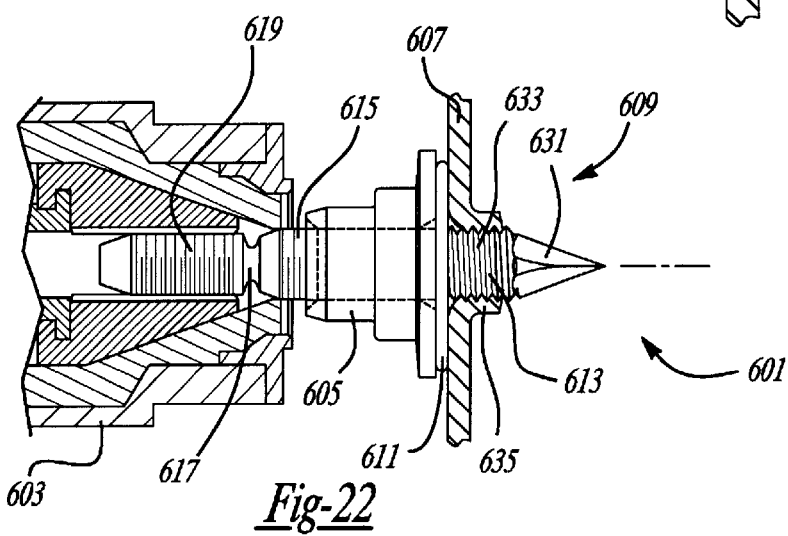

DOUBLE ENDED FASTENING SYSTEM

CROSS REFERENCE TO RELATED APPLICATIONS

This is a continuation-in-part of U.S. patent application Ser. No. 09/352,561, filed on Jul. 13, 1999 now U.S. Pat. No. 6,341,917, which claims priority to U.S. Provisional Application Serial No. 60/114,275, filed on Dec. 30, 1998, which are both incorporated by reference herein.

BACKGROUND OF THE INVENTION

This invention relates generally to fasteners and more specifically to a double ended fastening system.

It is common to arc weld an enlarged circular end of a threaded metal stud onto a sheet metal body panel of an automotive vehicle. Various parts are then inserted upon the single threaded stud and an internally threaded nut is rotationally inserted onto the stud. However, the nut installation is a time consuming process which often leads to undesirably varying fastening forces.

It is also known to use a pneumatic tool to swage and compress an unthreaded metal nut or sleeve over the arc welded stud in a torque-free manner. This torque-free construction employs a two-part stud, separated by a reduced diameter neck. The tool pulls off the threaded end after the nut is secured to the remaining threaded part of the stud. The nut can be unscrewed and reused. This stud is almost exclusively used without the need for holes in the sheet metal body panel. However, it is often undesirable to arc weld a stud directly to the sheet metal body panel. For example, the welding station is fairly expensive and takes up considerable space in the assembly plant. Furthermore, it is impractical to arc weld such a conventional stud to a plastic component instead of to the body panel. Thus, there is a need to secure a stud fastener directly to a plastic component while using a torque-free nut and a two segment threaded stud, in order to secure a plastic component to a body panel.

It is also known to press insert, insert mold or ultrasonically insert a knurled fastener into a plastic panel. See, for example, U.K. Patent Application GB 2 274 697 A entitled "Part Mounting Device and Method" which was published on Aug. 3, 1994. However, the bolt shown in FIG. 7B of the U.K. application is of a conventionally threaded variety using a standard threaded nut.

SUMMARY OF THE INVENTION

In accordance with the present invention, the preferred embodiment of a double ended fastening system includes a first segment for engaging a component and a second threaded segment for engaging a nut. In another aspect of the present invention, the first segment is threaded and a lateral projection or flange is present. A further aspect of the present invention provides a third segment, joined to the second segment by a reduced diameter neck, which is removable from the second segment after the nut is compressibly secured to the second segment of the stud. Still another aspect of the present invention employs a component having a stud receiving portion made of a polymer or soft metal. In yet a further aspect of the present invention, a self-drilling and self-tapping feature is provided on the first segment of the stud.

The present invention is advantageous over traditional devices, in that the present invention fastener is secured to the component off of the quickly moving assembly line and then the component and fastener assembly are quickly attached to the body panel with a compression sleeve or nut. Engagement of the nut onto the threaded stud does not require any torque upon the nut or stud, thereby maintaining the desired mounting of the stud to the component. Furthermore, a low cost nut can be used since it does not employ internal threads prior to insertion upon the stud. Moreover, the nut can be unscrewed and reused. The component-to-panel fastening also advantageously occurs on a single side of the body panel and is very quickly installed, compared to pre-threaded nuts, since the traditional nut run-down time is not required. Thus, the no torque fastening system of the present invention is ideally suited for direct mounting to polymeric and soft metal components. Additional advantages and features of the present invention will become apparent from the following description and appended claims, taken in conjunction with the accompanying drawings.

BRIEF DESCRIPTION OF THE DRAWINGS

FIG. 20 is a partially fragmented and enlarged side elevational view showing the third alternate embodiment of the present invention fastening system;

FIG. 21 is a partially fragmented side elevational view showing the third alternate embodiment of the present invention fastening system; and FIG. 22 is a partially fragmented side elevational view showing a fourth alternate embodiment of the present invention fastening system.

DETAILED DESCRIPTION OF THE PREFERRED EMBODIMENTS

Figure 1:
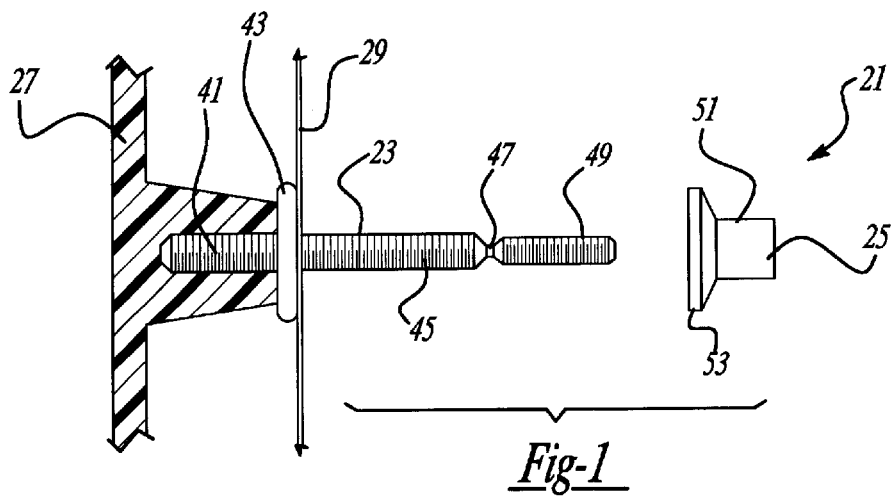
FIG. 1 is a partially exploded and fragmented side elevational view showing a first preferred embodiment of a fastening system of the present invention.
Figure 2:
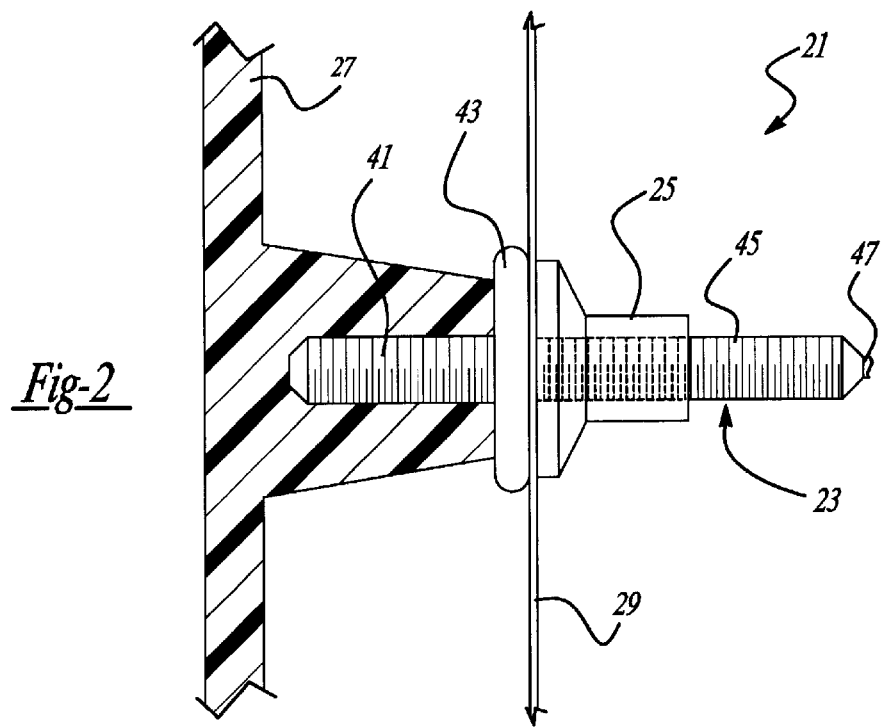
FIG. 2 is an assembled and partially fragmented side elevational view showing the first preferred embodiment of the present invention fastening system.

Referring to FIGS. 1 and 2, the first preferred embodiment of the fastening system 21 of the present invention employs a stud fastener 23 and a nut 25. The nut 25 is also known as a sleeve. Stud 23 and nut 25 serve to fasten a plastic or polymeric component or member 27 to a panel 29. Plastic component 27 can be an automotive vehicle part, such as: an exterior mirror housing; heating/ventilation/air conditioning blower, heater, insulator, duct or shield; wire harness locator; hose locator; exterior trim panel; interior garnish molding; bumper fascia; tail light; and side window mounting. Panel 29 is preferably a stamped sheet metal body panel.

Figure 3:
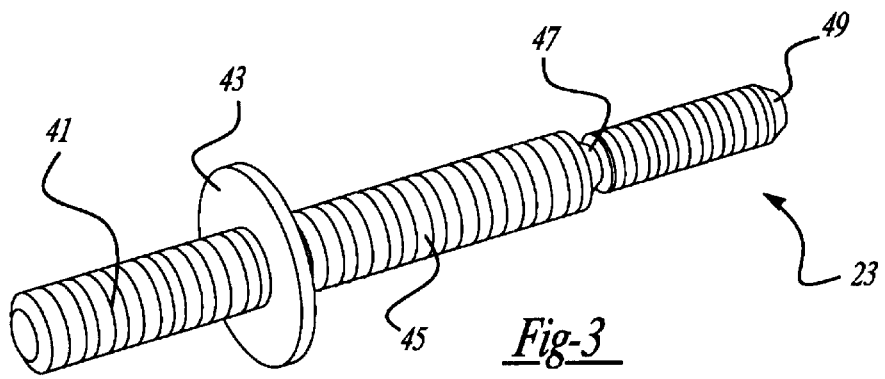
FIG. 3 is a perspective view showing the preferred embodiment stud of the present invention fastening system.
Figure 4:
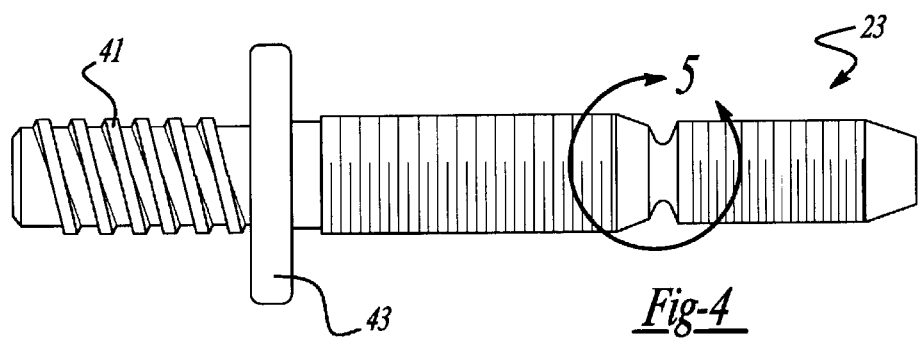
FIG. 4 is a side elevational view showing the preferred embodiment stud of the present invention fastening system.
Figure 5:
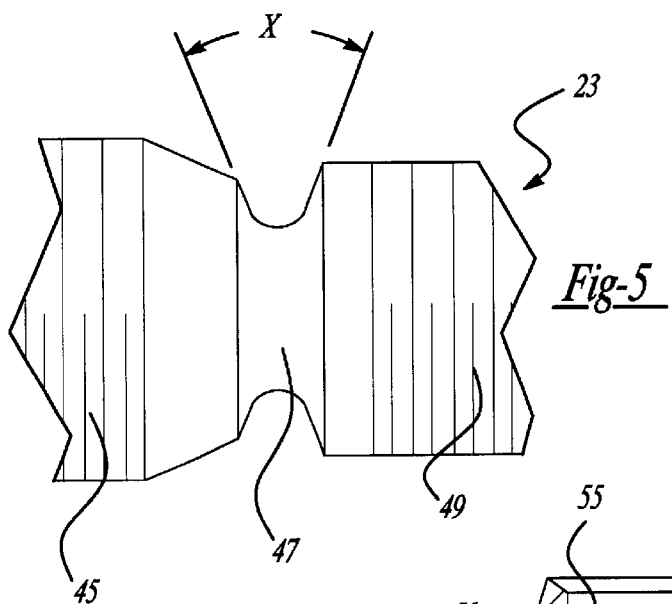
FIG. 5 is an enlarged side elevational view, taken within circle 5 of FIG. 4, showing the preferred embodiment stud of the present invention fastening system.

Stud 23 includes a first threaded segment 41, a circular flange 43, a second threaded segment 45, a neck 47 and a third threaded segment 49. This can best be viewed in FIGS. 3–5. First threaded segment 41 has a T6 by 1.6 mm thread, second threaded segment 45 has a M6 by 1.5 mm thread, and third threaded segment 49 has a M5 by 0.8 mm thread. The threads define external engagement patterns on the stud. Furthermore, neck 47 has a reduced diameter as compared to the threaded segments. Neck 47 is also provided with a forty degree (total) angular taper x and a circumferential radius at the apex of the taper to define the reduced diameter section. Stud 23 is preferably machined from 1010 steel having a Brinell hardness between 70 and 90.

Figure 6:
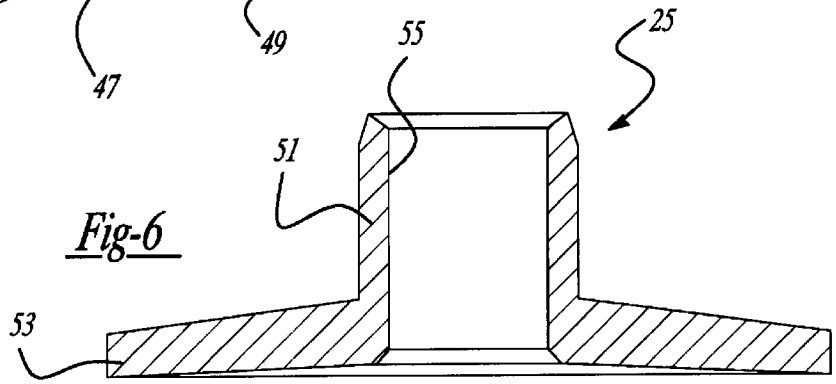
FIG. 6 is a cross sectional view showing the first preferred embodiment nut of the present invention fastening system.

FIGS. 1 and 6 show the first preferred embodiment nut 25. This nut 25 has a circular-cylindrical section 51 and an enlarged diameter portion 53. Nut 25 has a smooth and unthreaded internal aperture 55 prior to installation onto stud 23.

Figure 7:
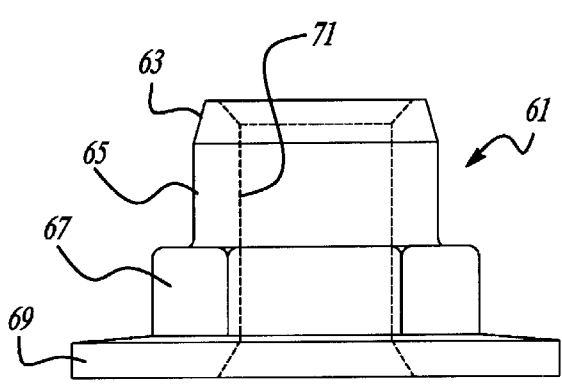
FIG. 7 is side elevational view showing a second preferred embodiment nut of the present invention fastening system.

FIG. 7 illustrates a second preferred embodiment nut 61. Nut 61 has an externally chamfered end 63, a circular-cylindrical section 65, a hexagonal wrench receiving formation 67 and an enlarged diameter portion 69. Nut 61 also has a smooth and unthreaded internal aperture 71 prior to installation onto stud 23. Nuts 25 and 61 are preferably formed from 1010 steel.

Figure 8:
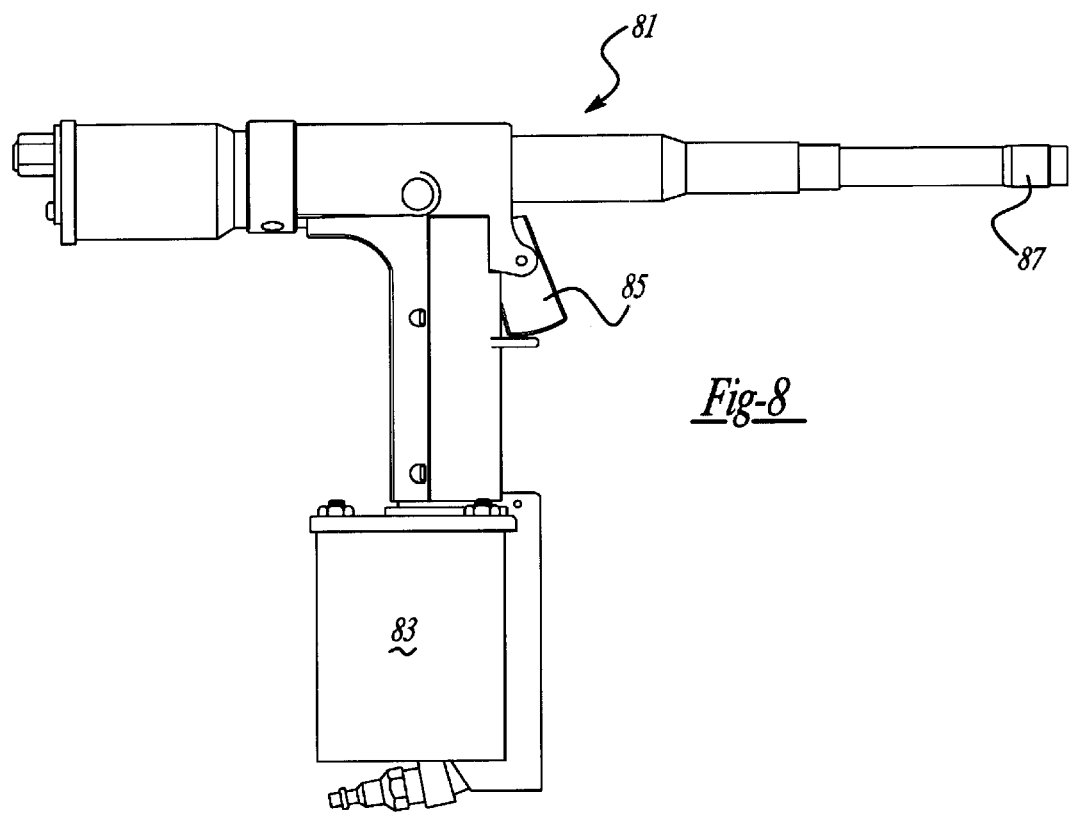
FIG. 8 is a side elevational view showing the preferred embodiment fastening tool of the present invention fastening system.
Figure 10:
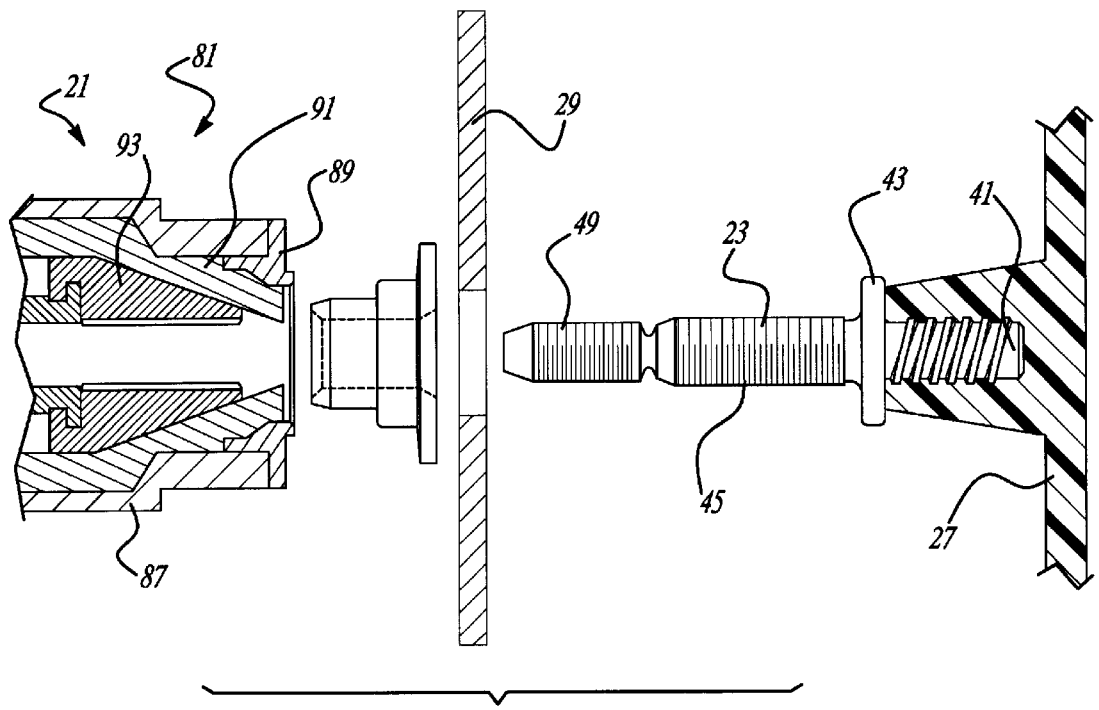

A pneumatically actuated fastening/setting tool 81 is shown in FIGS. 8 and 10. Tool 81 employs a piston cylinder 83 and trigger 85 to operate parts inside a nose 87. Tool 81 uses a standard air pressure between 85 and 100 psi to generate about 3000–5000 N of clamping force at the joint. Nose 87 of tool 81 further has a nose piece 89, jaw case 91 and jaw 93.

Figure 9:
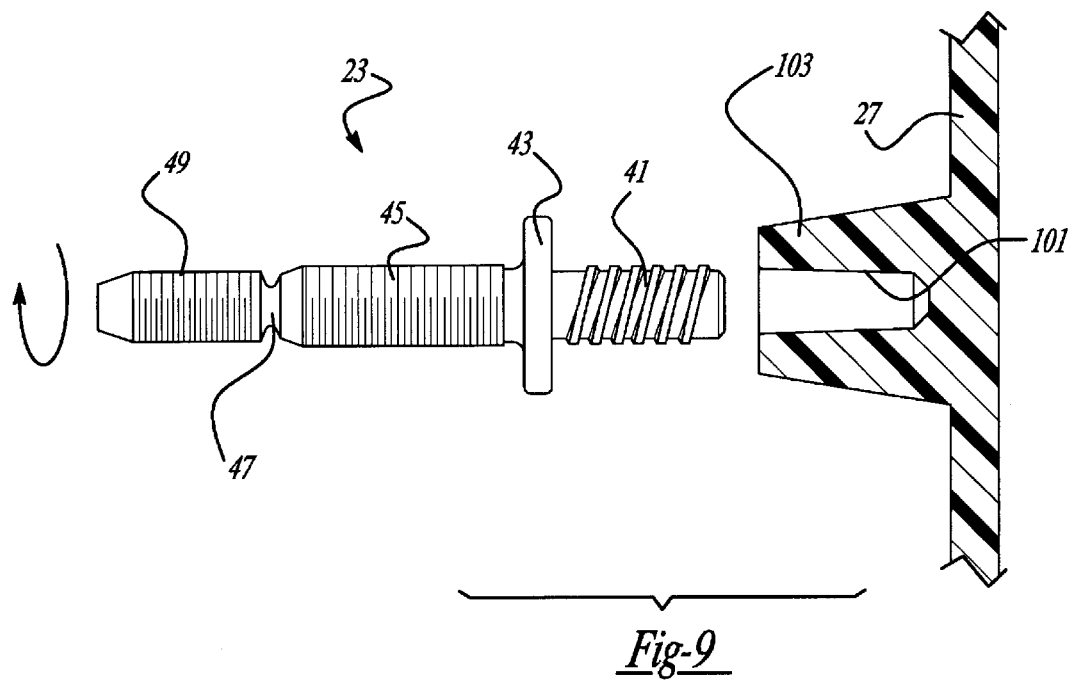
FIGS. 9–14 are a series of partially fragmented, side elevational views showing the assembly sequence of the second preferred embodiment of the present invention fastening system.

The sequence of fastening stud 23 to plastic component 27 and then, in turn, to panel 29 can be observed with reference to FIGS. 9–14. First, component 27 is injection molded from a plastic material such as Nylon. An unthreaded bore 101 is simultaneously formed inside a projecting boss 103. Second, first threaded segment 41 is rotated while being pushed into bore 101, as shown in FIG. 9. The threads of stud 23 cause the internal surface of boss 103 to become threaded. Alternately, a threaded or knurled end of a stud can be insert molded into the boss; however, the stud cannot be easily disassembled from the component, unlike with the preferred embodiments.

Third, the assembly consisting of component 27 and stud 23 is placed adjacent to an outside surface of panel 29. Flange 43 of stud 23 abuts and contacts against panel 29. Fourth, second and third threaded segments 45 and 49 are inserted through a slightly larger circular hole in panel 29.

Fifth, nut 61 (or nut 25) is linearly slid past third threaded segment 49 and onto second threaded segment 45. This can be seen by comparing FIGS. 10 and 11.

Figure 11:
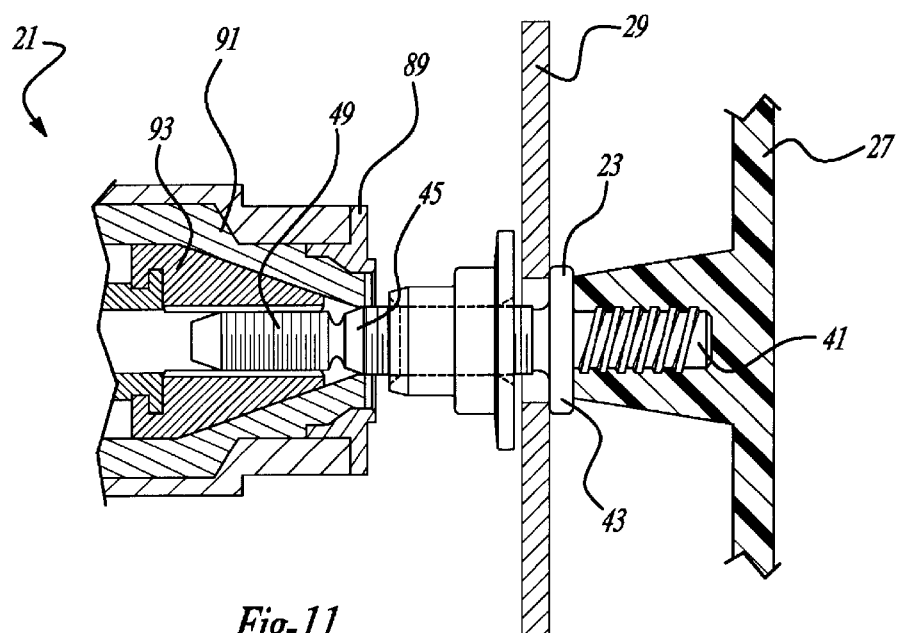
Figure 12:
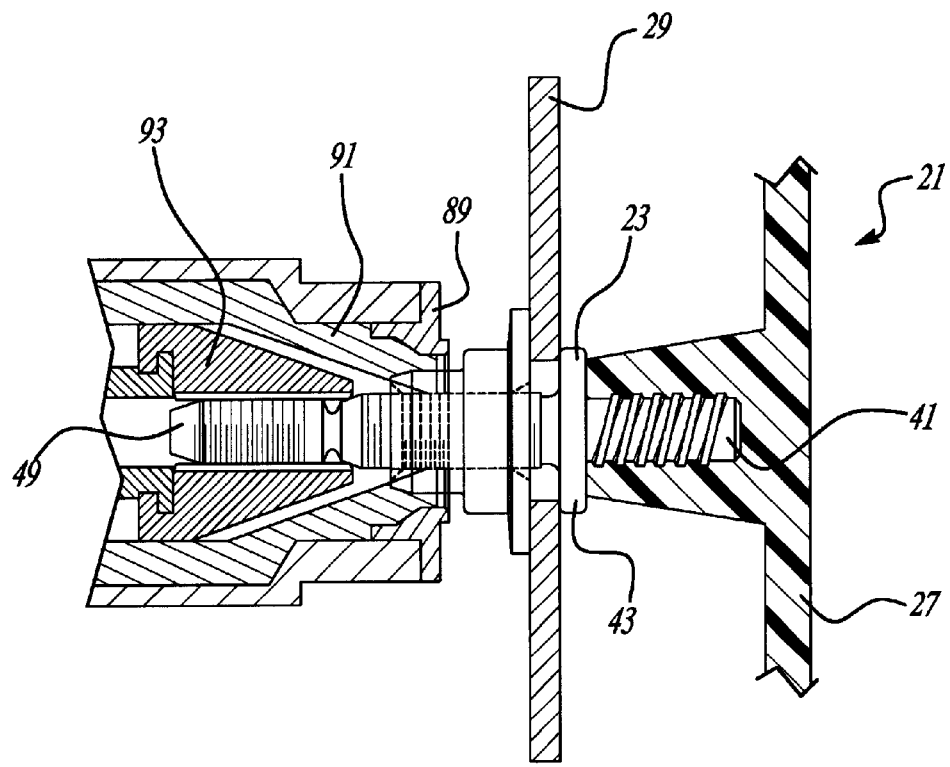

Sixth, referring to FIGS. 11 and 12, tool 81 is linearly inserted onto stud 23 and nut 61. This step may be concurrent with the prior step. Third threaded segment 49, acting as a mandrel, is received inside of jaw 93 while nose piece 89 and a distal end of jaw case 91 surround cylindrical section 65 of nut 61. Seventh, jaw 93 firmly grips third threaded segment 49 while jaw case 91 linearly pushes nut 61 into desired abutting contact against the inside surface of panel 29, creating a preload instead of torque. Eighth, jaw case 91 is caused to swage and compress cylindrical section 65 of nut 61 in an inward lateral manner thereby forming threads on aperture 71 of nut 61. This advantageously causes identically matching threads and eliminates the traditional problem of cross-threading of misaligned pre-threaded nuts and bolts. Moreover, the tool does not significantly apply any rotational or torquing force upon stud 23 or nut 61 during fastening; this preserves the secure relationship of stud 23 to component 27 and achieves high and repeatable quality of fastening forces to panel 29.

Figure 13:
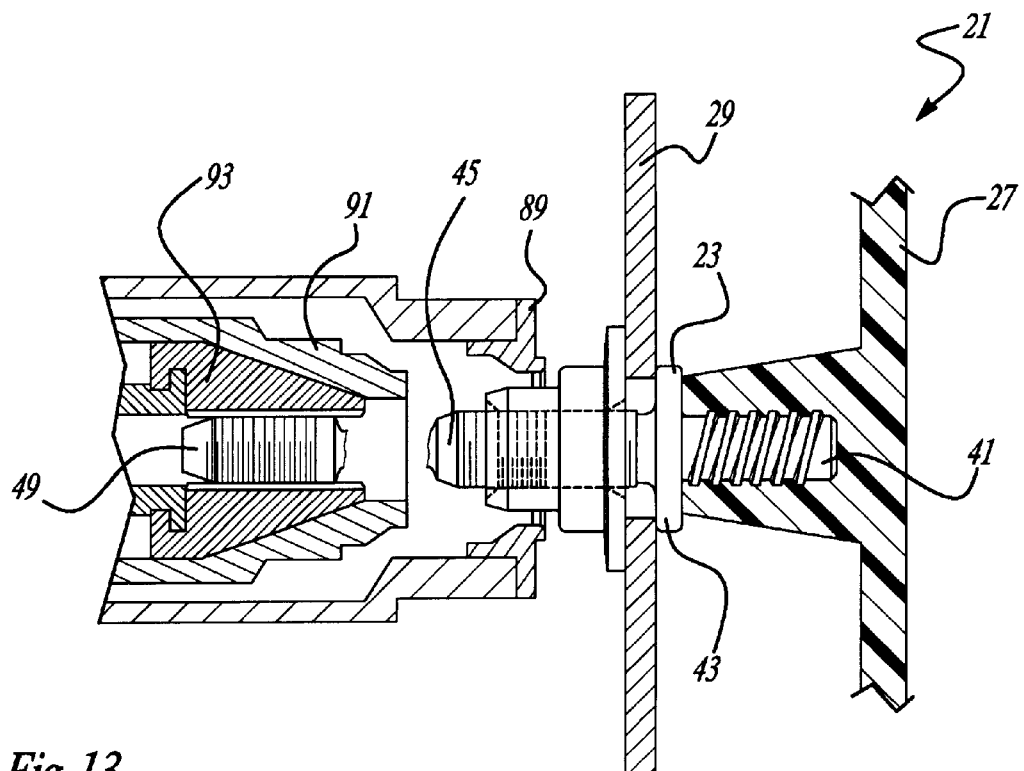
Figure 14:
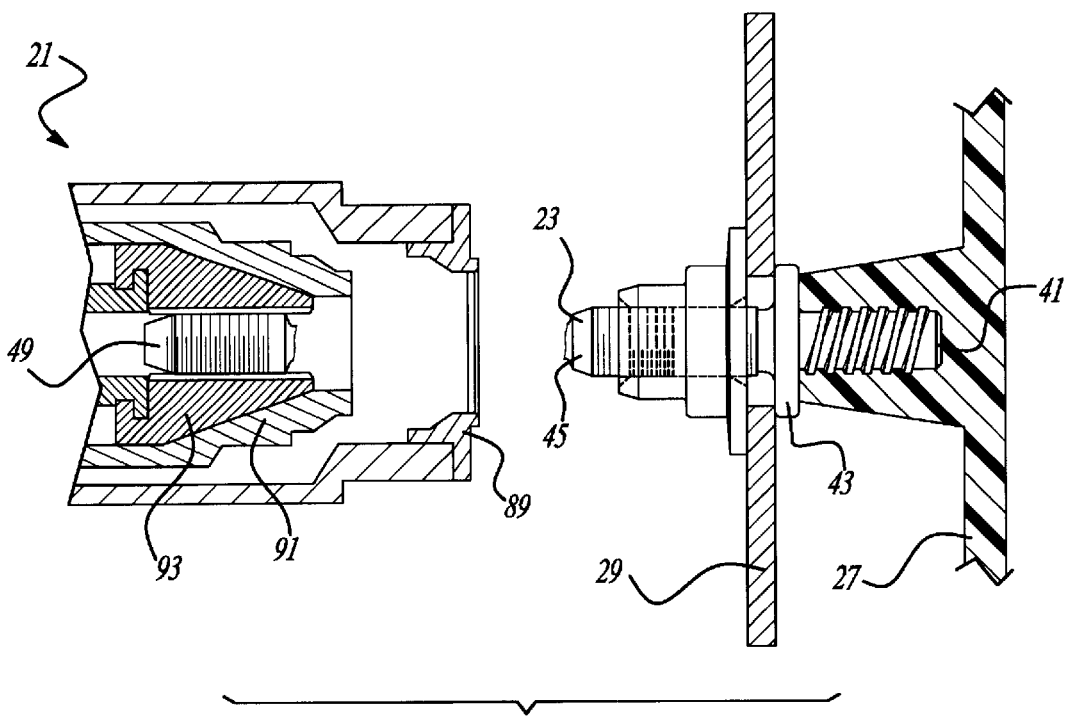

Finally, a comparison of FIGS. 12–14 demonstrates breaking of neck 47 wherein jaw 93, still retaining third threaded segment 49, is linearly moved away from second threaded segment 45. Third threaded segment 49 is then discarded. Nut 61 can thereafter be unscrewed from stud 23 by use of a wrench. Nut 61 can be reusable approximately five times.

Figure 15:
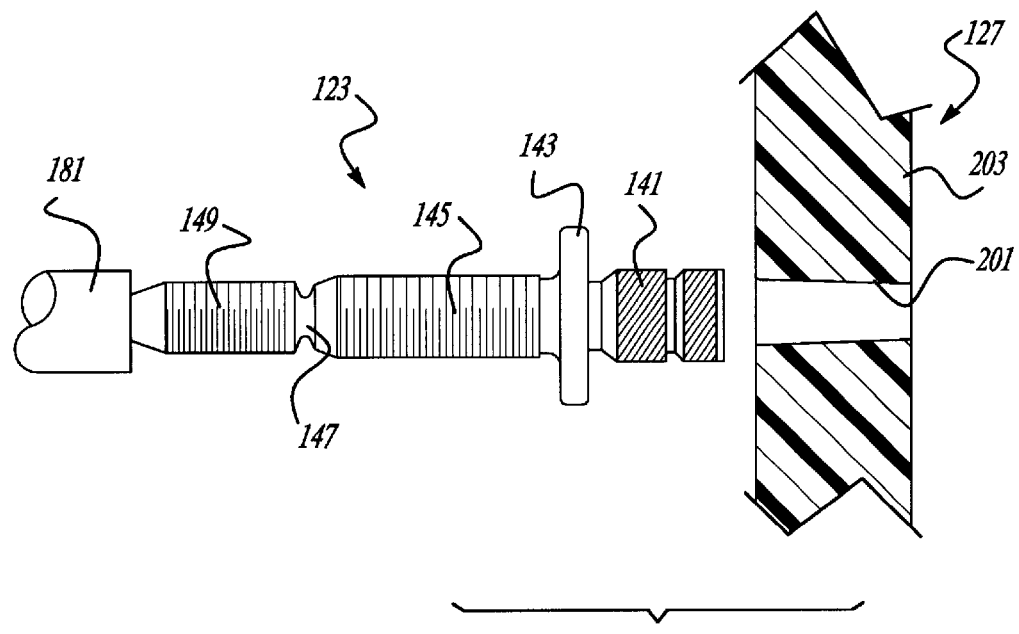
FIG. 15 is an exploded side elevational view, partially in section, showing a third preferred embodiment of the present invention fastening system.

A third preferred embodiment of the fastening system is shown in FIG. 15. In this embodiment, a stud 123, like that with the first preferred embodiment, has a pair of threaded segments 145 and 149 joined by a reduced diameter neck 147. A large diameter circular flange 143 is integrally attached to segment 145. However, a distinguishing feature from the prior embodiments is that a knurled segment 141 is integrally attached to flange 143 in a longitudinally extending and coaxial manner. Knurled segment 141 includes a pair of nominal diameter circular sections with a generally parallel knurl pattern on the external radial surfaces of the sections. These knurled sections are separated by a reduced diameter section. Another reduced diameter and smooth section is located between flange 143 and knurled segment 141.

An ultrasonic horn tool or high temperature conducting tool 181 is positioned adjacent a distal end of stud 123. During the ultrasonic or conductive heating operation, tool 181 serves to heat stud 123 while applying a longitudinally pushing force against the distal end of stud 123. Stud 123 is concurrently heated and inserted into a bore 201 in a fastening area 203 of a plastic component 127. Bore 201 preferably has a frusto conically tapered lead-in angle of about 8 degrees total. After tool 181 is removed or deenergized, the melted plastic is allowed to cool and rigidly engage knurled segment 141 in a permanently fastened manner. The nut swaging and neck breaking steps are subsequently performed as discussed with the prior embodiments.

Figure 16:
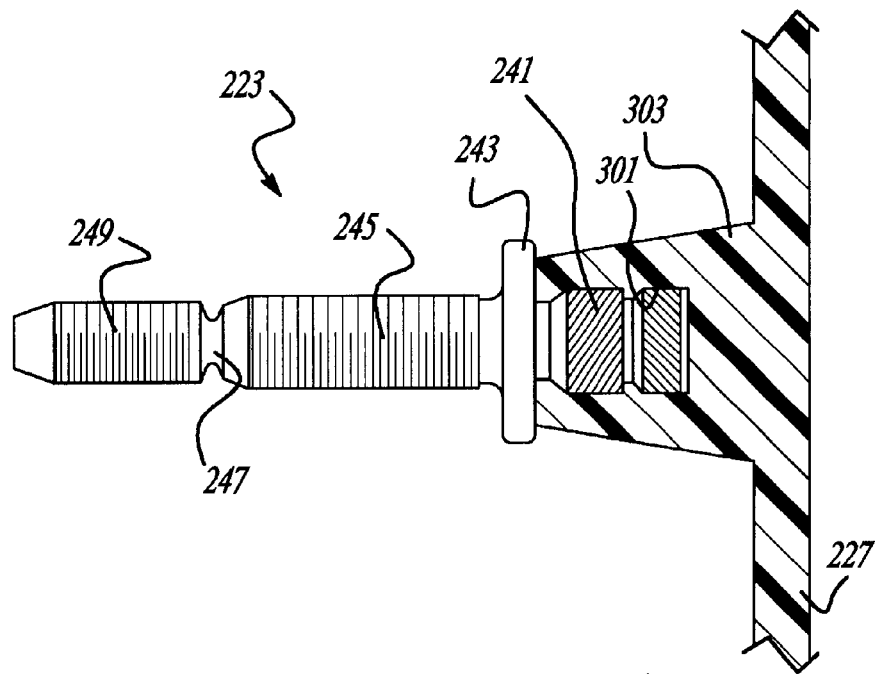
FIG. 16 is a side elevational view, partially in section, showing a fourth preferred embodiment of the present invention fastening system.

FIG. 16 illustrates a fourth preferred embodiment stud 223 having threaded segments 245 and 249 separated by a breakable neck 247. A knurled segment 241 longitudinally projects from a circular flange 243 as with the third preferred embodiment. However, with the present exemplary embodiment, an opposing or crossed knurl pattern is employed at knurled segment 241. Knurled segment 241 is ultrasonically or conductive heat inserted into a bore 301 of a projecting boss 303 depending from a plastic component 227. The plastic adjacent bore 301 is melted during the ultrasonic or heat insertion process and then allowed to reharden. Hence, the plastic material of boss 303 permanently secures stud 223 to plastic component 227. It is significant that the nut swaging operation does not tend to separate either embodiment of the knurled segments from the plastic component during the sheet metal panel fastening procedure due to employment of the circular flanges, as well as the non-rotational engagement of the nut with the corresponding threaded segments.

Figure 17:
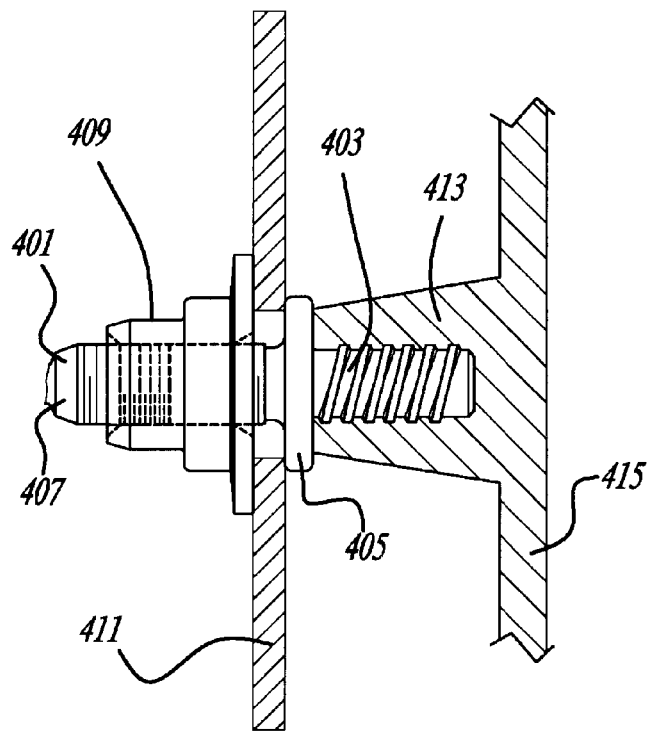
FIG. 17 is a partially fragmented side elevational view showing a first alternative embodiment of the present invention fastening system.

Referring now to FIG. 17, a first alternate embodiment fastening system employs a stud 401 having a first thread patterned segment 403, a flange 405, a second thread patterned segment 407 and a third thread patterned segment (not shown) which has already been severed at the neck as is presently illustrated. A nut 409 is compressed into engagement and conformity with the threads of second segment 407 for securing stud 401 to an automotive vehicle body panel 411. Thus, panel 411 is linearly compressed between nut 409 and flange 405 as has been disclosed with the prior embodiments. The major difference between this exemplary embodiment and the prior embodiments is that the threads of first segment 403 engage within a stud receiving portion 413 of a soft metal component or member 415. Component 415 can be an automotive exterior mirror bracket, headlamp bracket, instrument panel bracket or any of the other component parts discussed herein.

It is envisioned that component 415 can be machined, cast or otherwise formed from aluminum, magnesium, copper, tin, zinc, cast iron, lead or other soft metals, alloys thereof, resinated fiberglass, carbon fiber or composites. These "soft" materials preferably have a hardness of less than about 120 Brinell (BHN) and more preferably less than 75 BHN. A "soft" metal or material is herein defined as being less than the material hardness for the typical automotive body, sheet steel panel 411 which has a hardness of 126 BHN for AISI 1015 steel. For example, aluminum and its relevant alloys are typically between 28 and 120 BHN, relevant alloys of aluminum and copper are between 95 and 120 BHN, and an aluminum and magnesium alloy is between 26 and 120 BHN. Furthermore, lead is typically between 32 and 95 BHN, magnesium is between 63 and 85 BHN, and copper and its relevant alloys are between 44 and 120 BHN. First segment 403 of stud 401 can be insert cast into stud receiving portion 413, or may be threaded into a pre-formed bore in a self-tapping manner or through threaded engagement with pre-machined bore threads. The torque-free installation of nut 409 onto stud 401 advantageously minimizes undesired additional torquing and rotation of stud 401 relative to component 415 in order to prevent or minimize thread stripping and inadvertent disengagement of stud 401 from component 415. Cross-threading and lengthy nut rundown time on stud 401 is also reduced with the present invention.

Figure 18:
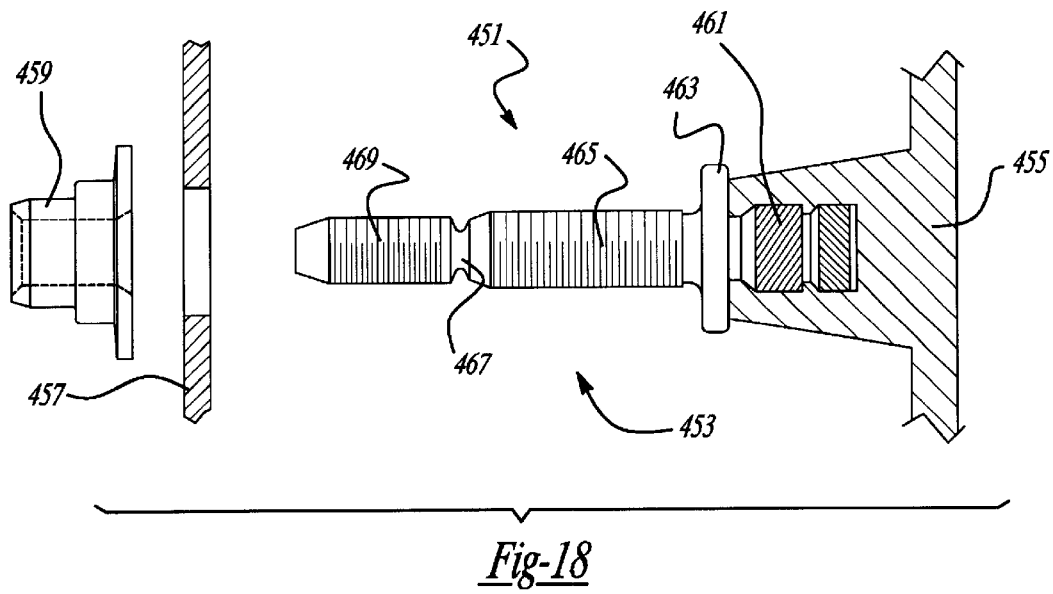
FIG. 18 is a partially fragmented and exploded side elevational view showing a second alternate embodiment of the present invention fastening system.

FIG. 18 illustrates a second alternate embodiment fastening system 451 which employs a stud 453, a soft metal component or member 455, a sheet metal automotive body panel 457 and a nut 459. Stud 453 has a first knurl patterned segment 461, an enlarged flange 463, a second thread patterned segment 465, a reduced diameter and breakable neck 467, and a third threaded and discardable segment 469. Nut 459 compressably retains stud 453 to panel 457 in a linearly installed and generally torque-free manner as has been previously described for the preferred embodiments. Again, the noteworthy difference with the present embodiment is that component 455 is made from a soft metal as was described for the first alternate embodiment system.

Figure 19:
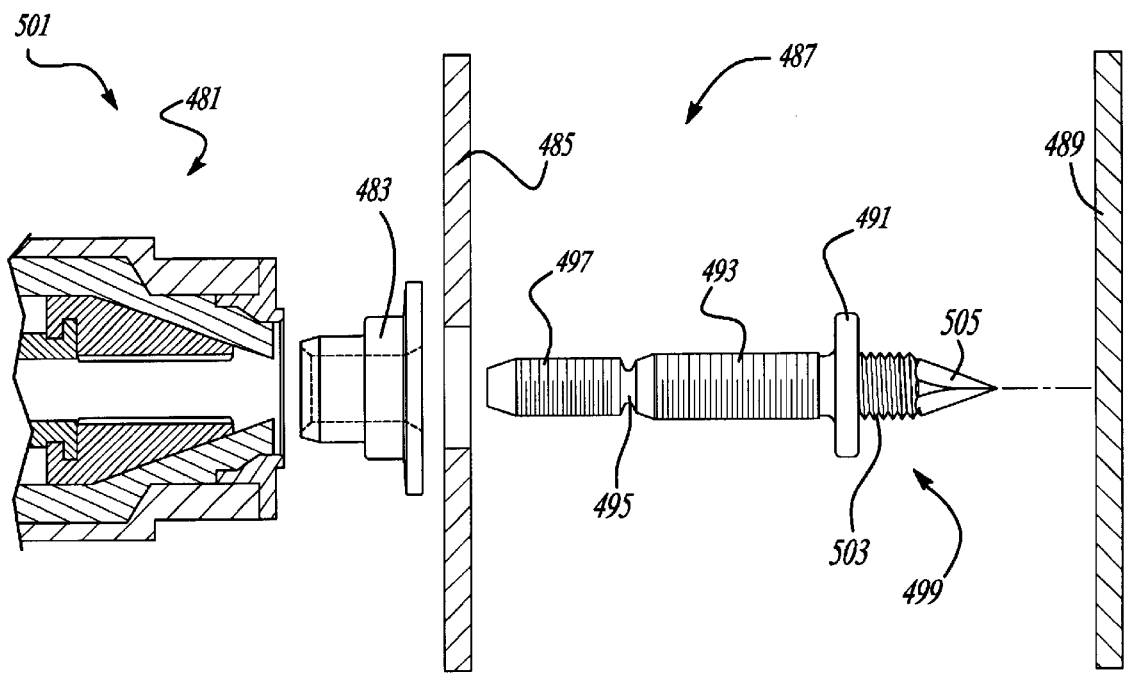
FIG. 19 is a partially fragmented and exploded side elevational view showing a third alternate embodiment of the present invention fastening system.

FIGS. 19 through 21 show a third alternate embodiment of the present invention fastening system 501. Fastening system 501 includes a pneumatically actuated fastening/setting tool 81, a compressible nut 83, an automotive vehicle body panel 85, a stud 87 and a component part or member 89. Tool 81, nut 83 and panel 85 are essentially the same as described with the preferred embodiments. Stud 87 also has a flange 91, a second thread patterned segment 93, a reduced diameter neck 95 and a third thread patterned segment 97 similar to those of the preferred embodiments. Stud 487, however, has a first segment 499 including a first thread pattern 503 and a point 505. When initially rotated by an automatic tool, first segment 499 serves to self-drill and create a hole in sheet metal panel 489, then extrudes a circular flange 507 in component 489; next, it self-taps and creates a matching thread pattern within the flange 507 of component 489. Thus, automated rotation of stud 487 by a fastening machine causes first segment 499 to create a hole and rotateably engage stud 487 to component 489 in a one-step manner. First segment 499 can be subsequently unscrewed and disengaged from component 489 for servicing or replacement if necessary.

Point 505 is of an inverted regular pyramid in shape and square in cross-section with four sides 509 and four sharp corners 511. Corners 511 serve as rectilinear cutting edges to drill edges for forming an initial pilot hole in component 489. Point 505, with its faces 509, further serves to extrude flange 507 after initial piercing of the hole. Threads 503 of first section 499 then cut female threads internally within extruded flange 507. Thus, the thread pattern of first section 499 is different than that of second and third sections 493 and 497, respectively. First segment 499 is constructed in accordance with U.S. Pat. No. 4,311,423 entitled "Hole Drilling, Extruding and Thread-Forming Sheet Screw" which issued to Hirabayashi on Jan. 19, 1982, and U.S. Pat. No. 4,068,554 entitled "Sheet Screw" which issued to Hirabayashi on Jan. 17, 1978; both of these patents are incorporated by reference herein.

Referring to FIG. 22, a fourth alternate embodiment fastening system 601 includes a tool 603, a nut 605, an automotive vehicle body panel 607, a stud 609 and a component part or member 611. Stud 609 has a first segment 613, a second thread pattern segment 615, a reduced diameter and breakable neck 617, and a thread patterned third segment 619. Second segment 615, neck 617, third segment 619, nut 605 and tool 603 are constructed in accordance with the previously discussed preferred embodiments. Furthermore, first segment 613 is defined by a point 631 and threads 633 constructed like that of the third alternate embodiment for self-drilling and self-tapping a hole and extruded flange 635 in panel 607. Additionally, nut 605 serves to secure component 611, which can be an electrically conductive eyelet, a bracket or second panel, against body panel 607. Component 611 has an internal aperture surrounding or at least partially surrounding second segment 615 of stud and is sandwiched between nut 605 and panel 607 when nut is linearly inserted onto stud 609 in a predominantly non-rotational manner; this minimizes undesired unscrewing of first segment 613 of stud 609 from body panel 607 during securing of component 611 by nut 605.

While various embodiments of the fastening system have been disclosed, it should be appreciated that other aspects can be employed within the scope of the present invention. For example, three or more studs may be necessary to retain a component onto a panel. Furthermore, the fastening system can be used to secure a motor housing, tube or other component to a panel of a household appliance, power tool or industrial machine. It is also envisioned that a traditionally pre-threaded nut and torquing action can be used with the present invention stud, although many of the advantages disclosed herein will not be achieved. Various materials and dimensions have been disclosed in an exemplary fashion, however, other materials and dimensions may of course be employed. It is intended by the following claims to cover these and any other departures from the disclosed embodiments which fall within the true spirit of this invention.

The invention claimed is:

1. A fastening system comprising:
  a member having a stud receiving portion;
  a stud having a first threaded segment and a second threaded segment, a fixed lateral projection separating the threaded segments, the first segment being secured internal to the stud receiving portion;
  a third threaded segment removably connecting to the second threaded segment opposite the first threaded segment, the threaded segments being substantially co-axially aligned with each other; and
  a nut operably engaging the second threaded segment.

2. The fastening system of claim 1 wherein the nut is unthreaded until compressed onto the second threaded segment.

3. The fastening system of claim 2 further comprising a panel having a hole operably receiving the second threaded segment, the lateral projection being a flange abutting against a first side of the panel and the nut abutting against an opposite second side of the panel, wherein the member is fastened to the panel by the stud and the nut.

4. The fastening system of claim 2 wherein the nut includes a wrench-receiving formation, the nut being removable from the second threaded segment and thereafter being reusably engageable upon the second threaded segment.

5. The fastening system of claim 1 wherein the stud receiving portion of the member is polymeric.

6. The fastening system of claim 1 wherein the stud receiving portion of the member is metal having a material hardness less than about 120 Brinell.

7. The fastening system of claim 1 further comprising a pointed self-drilling and self-tapping section located on an end of the first segment.

8. The fastening system of claim 1 wherein the stud receiving portion of the member has a bore which is unthreaded prior to insertion of the first threaded segment, and the first threaded segment is secured in the bore.

9. The fastening system of claim 1 wherein the member is an automotive vehicle mirror bracket.

10. The fastening system of claim 1 wherein the member is an automotive vehicle lamp.

11. The fastening system of claim 1 wherein the member is an automotive vehicle air temperature management component.

12. The fastening system of claim 1 wherein the member is an automotive vehicle bumper facia.

13. The fastening system of claim 1 wherein a thread type of the first segment is different than a thread type of the second segment.

14. The fastening system of claim 1 further comprising a breakable neck operable to join the second and third threaded segments, the neck having a smaller diameter than the second and third threaded segments.

15. A fastening system comprising:
  (a) an automotive vehicle component;
  (b) a stud including:
    (i) a first segment having a first patterned external surface, the first segment being operable to engage the component;
    (ii) a second segment having a second patterned external surface different from the first patterned external surface;
    (iii) a flange separating the first and second segments;
    (iv) a third segment having a third patterned external surface, the third segment being removably connected to the second segment opposite the first segment;
    (v) a neck operable to join the second and third segments, the neck having a smaller diameter than the second and third segments; and
  (c) a nut operably secured to the second segment free of a substantially torquing installation force.

16. The fastening system of claim 15 wherein an internal surface of the nut is substantially smooth until compressed onto the second segment whereafter the internal surface of the nut becomes patterned from the second segment of the stud.

17. The fastening system of claim 16 wherein the nut has a substantially cylindrical section and an enlarged diameter portion.

18. The fastening system of claim 15 wherein the second external surface of the second segment has a threaded pattern.

19. The fastening system of claim 18 wherein the nut includes a wrench-receiving formation, the nut is removable from the second segment and thereafter is reusably engagable upon the second segment.

20. The fastening system of claim 18 wherein the third external surface of the third segment has a threaded pattern.

21. The fastening system of claim 15 wherein the external surface of the first segment has a threaded pattern.

22. The fastening system of claim 21 wherein the stud engaged portion of the component is polymeric, the engaged portion has a bore operably receiving the first segment of the stud, and the bore of the component is substantially smooth and unthreaded prior to insertion of the first segment.

23. The fastening system of claim 15 wherein the stud engaged portion of the component is metal.

24. The fastening system of claim 23 wherein the portion of the component is a soft metal including at least one of the following materials: (a) aluminum; (b) magnesium; (c) copper; (d) lead; (e) tin; (f) zinc; and (g) alloys thereof.

25. The fastening system of claim 15 further comprising an automotive vehicle panel having a hole for receiving the second segment, the flange abutting against a first side of the panel and the enlarged diameter portion of the nut abutting against an opposite second side of the panel, whereby the component is fastened to the panel by the stud and the nut.

26. The fastening system of claim 15 wherein the first external surface of the first segment has a knurled pattern.

27. The fastening system of claim 15 wherein the stud engaged portion of the component is polymeric.

28. The fastening system of claim 15 wherein the stud engaged portion of the component has a hardness less than automotive vehicle component.

29. The fastening system of claim 15 further comprising a self-drilling and self-tapping feature located on an end of the first segment.

30. A fastening system comprising:
  (a) an automotive vehicle component having a portion made of metal with a material hardness of less than about 120 Brinell;
  (b) a stud including:
    (i) a first segment having a first patterned external surface, the first segment being operable to engage the metal portion of the component;

(ii) a second segment having a second patterned external surface different from the first patterned external surface;

(iii) a third segment having a third patterned external surface, the third segment being removably connected to the second segment opposite the first segment;

(iv) a breakable reduced cross-sectional area operable to at least temporarily join the second and third segments; and (c) a nut operably secured to the second segment substantially free of rotation during initial installation.

31. The fastening system of claim 30 wherein the second external surface of the second segment has a threaded pattern.

32. The fastening system of claim 31 wherein the nut includes a wrench-receiving formation, the nut is removable from the second segment and thereafter is reusably engageable upon the second segment.

33. The fastening system of claim 31 wherein the third external surface of the third segment has a threaded pattern.

34. The fastening system of claim 30 wherein the external surface of the first segment has a threaded pattern.

35. The fastening system of claim 30 wherein an internal surface of the nut is substantially smooth until compressed onto the second segment whereafter the internal surface of the nut becomes patterned from the second segment of the stud.

36. The fastening system of claim 30 further comprising an automotive vehicle panel having a hole for receiving the second segment, the flange abutting against a first side of the panel and the enlarged diameter portion of the nut abutting against an opposite second side of the panel, wherein the component is fastened to the panel by the stud and the nut.

37. The fastening system of claim 30 wherein the first external surface of the first segment has a knurled pattern.

38. The fastening system of claim 30 wherein the portion of the component is a soft metal including at least one of the following materials: (a) aluminum; (b) magnesium; (c) copper; (d) lead; (e) tin; (f) zinc; and (g) alloys thereof.

39. A fastening system comprising:
(a) a structure;
(b) a stud including:

(i) a first segment having a thread and a point, the first segment being operable to engage the structure;

(ii) a second segment having a patterned external surface;

(iii) a third segment having a patterned external surface, the third segment being removably connected to the second segment opposite the first segment;

(iv) a breakable neck operable to at least temporarily join the second and third segments; and (c) a nut operably secured to the second segment.

40. The fastening system of claim 39 wherein the first segment operably self-drills a hole and self-taps a thread in the structure.

41. The fastening system of claim 39 wherein the first segment includes multiple flat faces at least partially joined at corners.

42. The fastening system of claim 39 wherein the first segment operably extrudes a flange in the structure.

43. The fastening system of claim 39 wherein the structure has a stud receiving portion made of metal.

44. The fastening system of claim 39 wherein the structure is an automotive vehicle body panel.

45. The fastening system of claim 39 further comprising an automotive vehicle body panel having a hole located around the second segment of the stud, wherein the structure is a component part removeably secured to the body panel by the stud and the nut.

46. The fastening system of claim 39 further comprising an electrically connective member secured to the structure by the stud and the nut.

47. The fastening system of claim 39 wherein the nut is secured to the stud free of a substantially torquing installation force.

48. The fastening system of claim 39 wherein an internal surface of the nut is substantially smooth until compressed onto the second segment whereafter the internal surface of the nut becomes patterned from the second segment of the stud.

49. The fastening system of claim 39 wherein the patterned surfaces of the second and third segments are threads having a different characteristic than the thread of the first segment.

* * * * *

UNITED STATES PATENT AND TRADEMARK OFFICE
CERTIFICATE OF CORRECTION

PATENT NO. : 6,672,791 B2
DATED : January 6, 2004
INVENTOR(S) : Gary L. Schubring et al.

It is certified that error appears in the above-identified patent and that said Letters Patent is hereby corrected as shown below:

<u>Title page,</u>
Item [75], Inventors, "Shuan" should read -- Shaun --; "Naugatuck, MI" should read -- Naugatuck, CT --; and "Sparks, MI" should read -- Sparks, MD --.
Item [56], References Cited, OTHER PUBLICATIONS, "Principels" should read -- Principles --.

Signed and Sealed this

Eighteenth Day of May, 2004

JON W. DUDAS
*Acting Director of the United States Patent and Trademark Office*